Jan. 16, 1934. J. F. CORY 1,943,950
AUTOMATIC CHANGEOVER CONTROL
Original Filed Nov. 30, 1929  2 Sheets-Sheet 1

Joseph F. Cory INVENTOR
BY Loyd J. Miller
ATTORNEY

Jan. 16, 1934.  J. F. CORY  1,943,950

AUTOMATIC CHANGEOVER CONTROL

Original Filed Nov. 30, 1929  2 Sheets-Sheet 2

INVENTOR
Joseph F. Cory
BY Loyal J. Miller
ATTORNEY

Patented Jan. 16, 1934

1,943,950

UNITED STATES PATENT OFFICE 1,943,950

AUTOMATIC CHANGEOVER CONTROL

Joseph F. Cory, Oklahoma City, Okla.

Renewal of application Serial No. 410,670, November 30, 1929. This application March 3, 1933. Serial No. 659,580

5 Claims. (Cl. 88—17)

This application is a renewal of my application No. 410,670 filed Nov. 30, 1929, and allowed April 10, 1932.

My invention relates to automatic changeover control for motion picture projectors.

The objects of my invention are to provide a device of this class which is new, novel, practical and of utility; which will be applied to each of a pair of motion picture projectors; which will operate upon electric current; which will automatically set in motion the motor of the idle projector, and in timed relation to such action will thereafter simultaneously and automatically close the shutter of the active projector and open the shutter of the projector just becoming active; which may be adjustably set to allow the motor of the idle projector to attain its full speed before the projector shutter opens; which may be adjustably set with regard to the pictures upon the final end of the running film and those upon the initial end of the film about to be run, so that when the changeover is made there will be no break in the continuity of the picture; a device which may be applied to motion picture projectors now in use or which may be built into new machines; which will be relatively inexpensive, simple, and durable; which will be positive in action; which will be particularly effective in use with sound producing films; which will release the operator for other important duties; which will be efficient in accomplishing all of the purposes for which it is intended.

It is usual in the operation of motion picture projectors to have twin machines which are in active operation alternately. While one of the machines is running film the other is prepared for instant use. In this operation it is customary for the machine operator to closely scan the running picture and as the latter approaches its end, at a point indicated by the picture cue-sheet the operator sets in motion the motor of the idle machine. Then, an instant later, when the motor has attained its full speed, the operator throws the usual switch which electrically closes the projector shutter of the first machine and simultaneously opens the shutter of the second machine. It will be apparent that the continuity of the picture which is being thrown upon the screen will depend upon the judgment, the skill, and the attentiveness of the operator, in properly timing the changeover.

My device will eliminate the hazards of human skill, judgment and attentiveness of the operator, and will automatically set in motion the motor of the idle machine, will allow time for its attaining full speed, and will then simultaneously close the shutter of the first machine and open the shutter of the second machine. These automatic operations will be timed and initiated by the running films.

With these and other objects in view as will more fully appear, my invention consists in the construction, novel features, and combination of parts hereinafter more fully described, pointed out in the claims hereto appended, and illustrated in the accompanying two-sheet drawing, of which, Figure 1 is a fragmentary perspective view of a film reel with the automatic film trip for the changeover switch, disposed thereon;

Like characters of reference designate like parts in all the figures.

Figure 1:
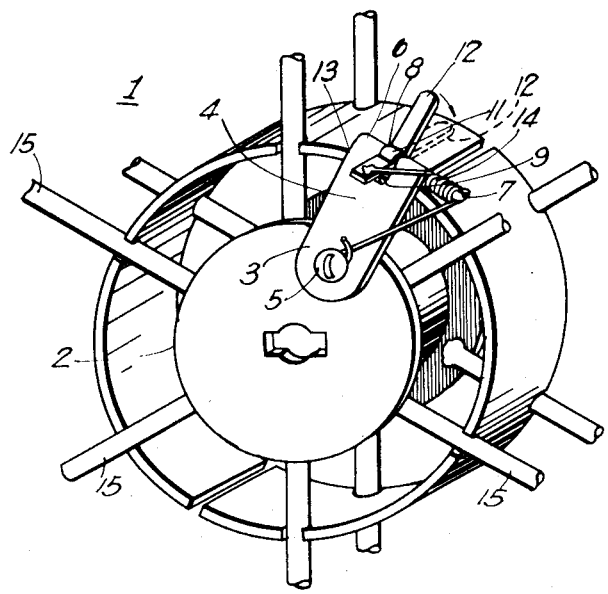

It is understood that various changes in the form, proportion, size, shape, weight and other details of construction, within the scope of my invention, may be resorted to without departing from the spirit and broad principles of my invention and without sacrificing any of the advantages thereof; and it is also understood that the drawings are to be interpreted as being illustrative and not restrictive.

One practical embodiment of the invention as illustrated in the drawings comprises:

For each one of a plurality of projection machines, the following:

A usual film reel 1, having upon its hub plate 2 my automatic trip member 3. Said member 3 comprises a flat, thin plate 4 which is rigidly attached to the said hub plate 2 by a screw 5. The said plate 4 extends radially as to the axis of the said hub plate, and its free end portion is turned revolutely to provide a bearing 6 for the hinge pin 7. The central portion 8 or the said revolute end 6 is cut and bent outwardly at right angles to said plate 4 to form a stop 9. Within the recessed portion 8 and pivoted upon the pin 7 is seated a bearing 11. Rigidly disposed upon the bearing 11, at right angles to each other are arms 12 and 13. A coil spring 14 encircles the extending end portion of the hinge pin 7, has one of its ends anchored to the said screw 5 and its other end is fastened to the extending end portion of the said arm 13. By means of spring 14 the arm 12 is normally held in alinement with those spokes 15 which radiate from said hub plate 2. In this position the arm 13 is at rest upon the stop 9, and extends outward laterally as to the face of the said plate 4. In the use of that part of my device described above and best illustrated in Figure 1, the winding of the first few turns of the film upon the drum of the reel 1, will be accomplished with the arm 12 unstanding from said drum. The arm 12 will then be depressed manually to lie flat upon the last made turn of said film. In this position of arm 12 the arm 13 will aline with the said spokes 15. It will be obvious that the said arms 12 and 13 will be held in their respective positions while the reel is being filled with the residue of film, and will so continue, while the said film is being run through the projecting machine, until such time as the film has been run from the reel to the turn of the film which contacts the top of the said arm 12. When this turn of the film is removed, the arm 12, actuated by the spring 14 will lift from the remaining turns of film upon the reel; by the same movement the arm 13 will assume its normal position lateral to said plate 4, and as so extended will be in a position to trip the changeover switch 10 yet to be described.

Figure 5:
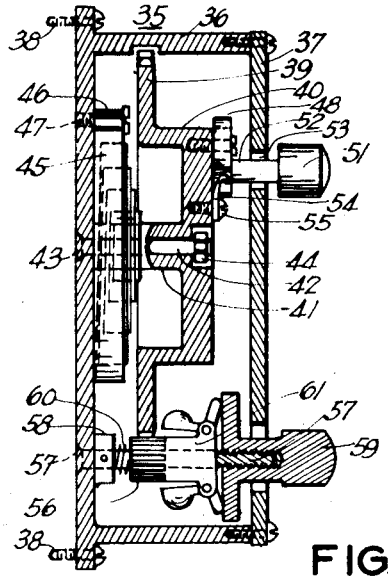
Fig. 5 is a sectional side elevational view of the shutter and motor timing control, and its housing.

The said changeover switch 10 comprises a box housing 16 and a cover 17 adapted to fit evenly and firmly thereupon. Said housing 16 is centrally and threadedly disposed upon an externally threaded and flanged member 18 which passes loosely through a perforation shown as 19 in the side wall 20 of the usual film magazine 21. Said member 18 is held to the wall 20 by the threaded nuts respectively 22 and 23. Axially said member 18 is provided with a bore through which extends the shaft 24. Rigidly but removably affixed to the extending end of the shaft 24, and lateral thereto is the trip arm 25. Said trip arm is so positioned within the said magazine as to be tripped by the arm 13 of the automatic trip member 3 when arm 13 is in its free and extended position. Integral with, or rigidly fixed to the end of the said shaft 24, within the housing 16 is the cup shaped member 26 which has its peripheral edge portion notched as is shown at 27. The notch 27 is adapted to fully seat, when the switch 10 is open, the beveled and insulated lug 28, outstanding from the contact arm 29. The said lug 28 is adapted to be slipped partially from the notch 27, during a partial rotation of the cup 26, which is caused by the tripping of said arm 25. This action of the lug 28 will cause the contact point 30 on said arm 29 to make a momentary contact with the contact point 31 upon the arm 32. When trip arm 13 has passed on beyond trip arm 25, the latter will immediately assume its upright position, due to the pressure of the spring contact arm 29, causing lug 28 to co-act with the bevel of notch 27. Additional spring means to secure this result may be supplied if desired. Said arms 29 and 32 are secured in a usual insulated manner to the switch cover 17, and are provided, respectively, with the insulated wires 33 and 34. The wire 33 leads to the automatic timing control 35, best shown in Figure 5 and Figure 6, while wire 34 is connected to a source of electric energy.

The automatic timing control 35 is provided with a box housing 36 having a suitable removable cover 37, and is adapted by the plurality of screws 38 for disposal in any convenient place upon or adjacent to the projecting machines. The function of this device is to receive electrical current through the said wire 33 from the automatically operated switch 10, and to instantly close a switch upon the return from the motor of the idle projector, and at a timed interval thereafter to close a switch which simultaneously opens the projection shutter of the idle machine and closes the shutter of the running machine. Within the said housing 36 is a toothed gear wheel 39 which has a relatively large offset central portion 40. Integral with the said portion 40 is an extending hub 41 which is axially bored for the passage therethrough of the axle 42. Axle 42 is forwardly passed through the rear wall of the said housing 36 and is provided with a countersunk head 43. Gear 39 is held upon the said axle 41 by the nut 44. For actuating said gear 39 I provide a usual clock spring 45, its revolute outer end 46 anchored to the rear wall of said housing 36 by a usual screw 47. The central turn of the clock spring is rigidly fastened to the face of the said hub 41 in an usual manner.

Upon the face of said central offset portion 40 I provide a cam plate 48, the curved outer edge of which normally extends somewhat beyond the periphery of the said offset portion 40. The cam 48 is provided with a plurality of slots shown as 49 through which pass the screws 50 which hold said plate slidably to said member 40. Cam 48 is provided with an extending handle 51 which is rotally free upon the handle pin 52. The handle 51 extends externally as to the said housing cover 37 and the latter is provided with a curved or arcuate slot shown as 53, through which the said handle pin 52 moves in an arc, for the partial rotation of the gear wheel 39. The slots 49 provide a means for permitting the said handle 51 to withdraw said cam plate 48 to a position in which its outer edge will aline with the periphery of the offset member 40. For holding said cam plate 48 in its extended position is provided the spring 54, one end of which is held upon the face of said member 40 by the screw 55.

Below the gear 39 and meshing therewith is a pinion 56, which is adapted to rotate upon the axle pin 57. The pin 57 enters through the rear wall of the housing 36, is provided therein with a set collar 58 and at its opposite end portion is threadedly provided with the governor-control head 59. Between the set collar 58 and the pinion 56, a spiral compression spring 60 encircles said axle 57. Oppositely upon axle 57 is disposed a usual adjustable speed governor 61, for the said gear 39.

Within the said housing 36 and adjacent to the gear 39 is disposed the electromagnet 62, having a base 63. Arising from a side of said base 63 and insulated from magnet 62 is an arm 64, through the upper portion of which threadedly extends a contact rod 65. External to arm 64 the rod 65 is provided with a thumb nut 66, and is connected with a return wire 67 leading from a motor 68. At its opposite end the rod 65 is provided with a contact point 69. Arising from the said base 63 at the side opposite the arm 64, is a flexible spring arm 70. The upper portion of arm 70 is provided with a projecting contact point 71, adjacent to said point 69, but normally not in contact therewith. Opposite said point 71 upon the arm 70 extends a lug 72, adapted to rest, normally, in the recess shown as 73 within the periphery of the member 40. The upper and central portion of the arm 70 is provided with a bar 74 of soft iron or the like, adapted to be drawn into contact with the said magnet 62 when the latter is energized. It will be understood that when the said bar 74 is drawn to contact the magnet 62, the said point 71 will be caused to contact the point 69. It will also be noted that arm 70 is connected with the post of said magnet 62 which is connected with the return wire 88. The other post of the magnet 62 has connection with the said electric wire 33.

Within the said housing 36 and at a side of same opposite the magnet 62 are positioned upon a suitable rigid support 76, a pair of parallel spring contact arms shown respectively as 77 and 78. Said arm 78 is flexible and is provided upon its upper end portion with a lug 79, similar to the said lug 72. Lug 79 normally extends to a point adjacent the periphery of the said member 40, but is adapted to be forced backward by its contact with the curved peripheral edge of the said cam 48, when the latter reaches a desired position in its said partial rotation with the gear wheel 39. The lug 79 is also adapted, after the passage thereby of the said cam 48 to drop back to its normal position. At their lower end portions, said contact arms 77 and 78 are connected in any usual manner to the respective wires 82 and 83.

Figure 7:
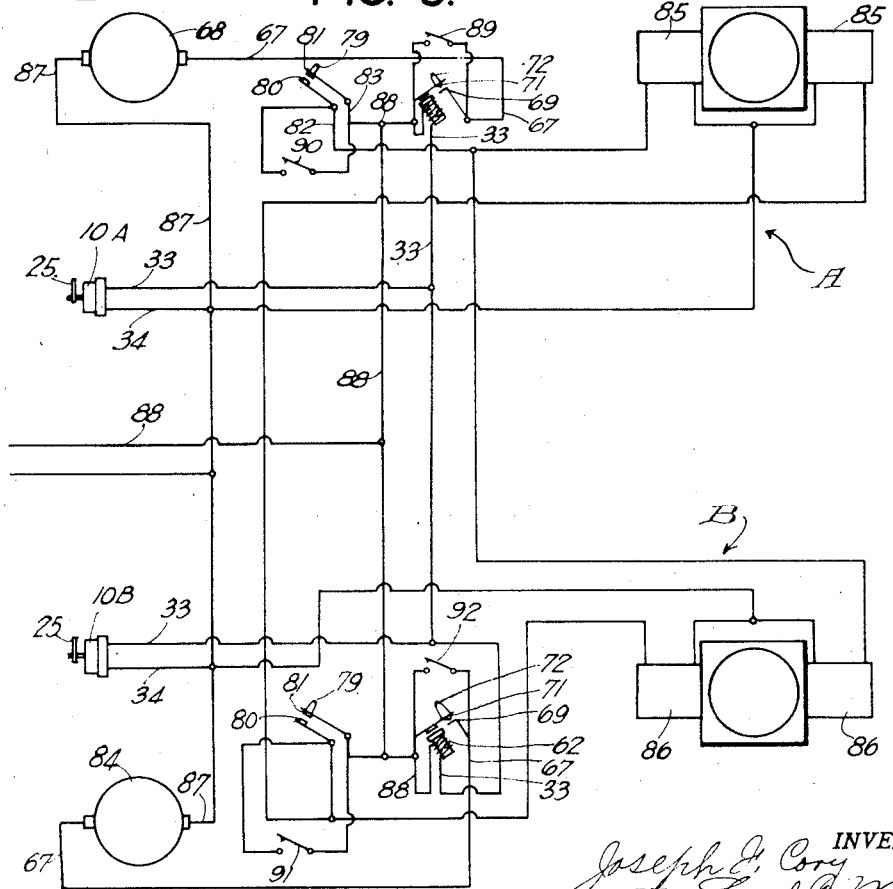

In the description of the operation of my device, it will be assumed that the twin projection machines, not shown, but which are referred to respectively as A and B, are as usual equipped with shutters which are shown respectively as 85 and 86, and which are adapted to be opened and closed by electro-magnet means. It will further be assumed that these units, together with the various members of my invention will have been properly connected with the wiring system, as shown in Figure 7, in which the numeral 87 indicates the live feed line, from a source of supply, not shown, and the numeral 88 indicates the return line of same. It will be obvious that any desired number of manually operated switches, not shown, may be disposed upon the wiring system at desired points.

In the preparation of said projectors A and B for operation it will be assumed, that as previously described, the film for same will have been run upon the respective reels with due regard to the proper placement of the said respective arms 12 between two of the first few turns of film upon each reel.

The desired machine, which for the purpose of illustration I will assume to be machine A, will be placed in operation first by the closing of the hand switch 89, shown in Figure 7. This will set in operation the motor 68, which is associated with machine A. An instant later when the said motor has attained its full speed, the hand switch 90 will be closed for an instant, which will be sufficient to open the projector shutter 85, of machine A. The said hand switch 89 will remain closed during the first continuous run of film upon said machine A.

Figure 3:
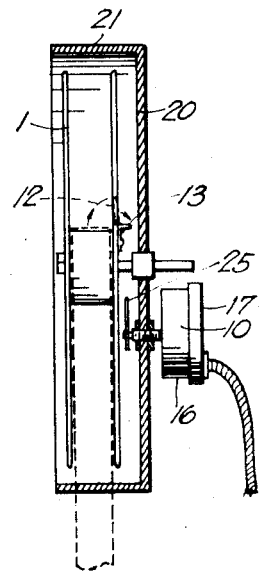
Fig. 3 is a sectional elevational view of a film magazine, my automatic changeover switch disposed therein, and a reel embodying my automatic trip, therewithin.
Figure 2:
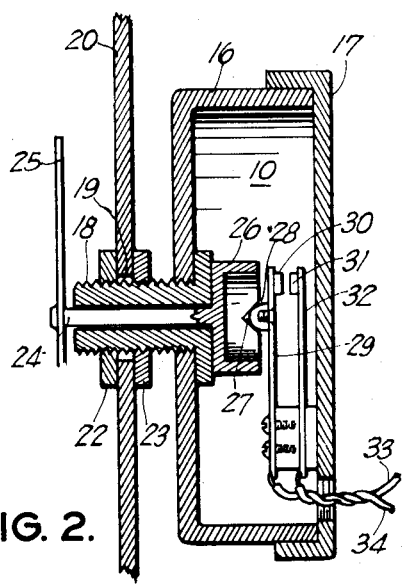
Fig. 2 is a sectional elevational view of the automatic changeover switch, disposed upon a fragmentary section of a film magazine.
Figure 4:
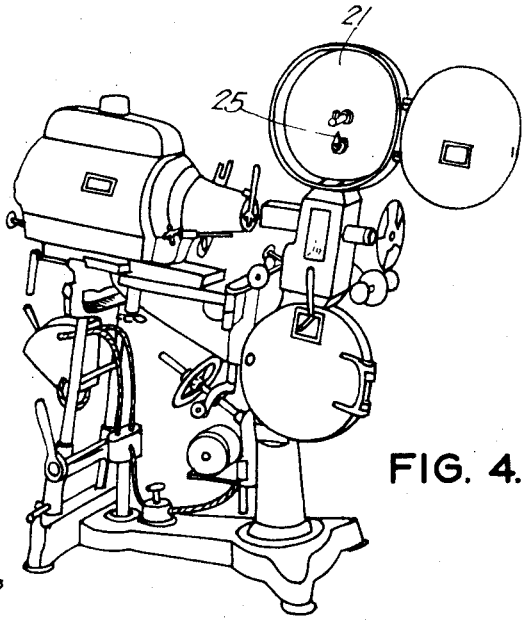
Fig. 4 is a perspective view of a usual motion picture projection machine, showing the actuating arm of my changeover switch disposed within the upper film magazine.

When the film upon the reel 1 of machine A reaches the point near its end at which the said arm 12 is released to the action of said spring 14, arm 12 will spring into alinement with the reel spokes 15, the arm 13 will be thrown into its extended position, and, rotating with said hub plate 2, will trip the arm 25 of the automatic switch which is shown as 10 in Figures 2 and 3, but which in Figure 7 is shown as 10a because of its association with machine A. It is to be understood that the said switch 10a is closed for an instant, only, but its instant contact is sufficient to form the connections as shown in Figures 7 to energize the said magnet 62 which is associated with machine B and with its motor 84. The magnet 62 attracts to itself the arm 70 and closes the contacts 71 and 69, shown in the lower part of Figure 7, thus completing the circuit necessary for the operation of said motor 84. By the same movement of the arm 70, the said member 40 and gear 39 are released to the action of the clock spring 45. The member 40 performs a partial rotation, counter-clockwise, until stopped by the contact of its peripheral lug 93 with the pinion 56. In this movement the cam 48 will have co-acted with the lug 79 to close the contact points 80 and 81. The circuit thus closed will open the shutter 86 of machine B and will simultaneously close the shutter 85 of machine A. As previously described, the interval required for the movement through its arc of the said cam 48, may be adjustably timed by means of the governor 61, and will be such as to allow the motor 84 to attain its full speed before the opening of shutter 86. Machine B will now be in full operation, at which time the said switch 89 of machine A will be opened, disconnecting motor 68. It is to be understood that said hand switches respectively 89, 90, 91 and 92, are provided, primarily for use in starting and in operating a desired one of the machines A and B for the initial run of the performance or show, and that thereafter, so long as the machines A and B are alternately in continuous operation, said switches will remain open, each changeover which follows being accomplished wholly automatically.

Figure 6:
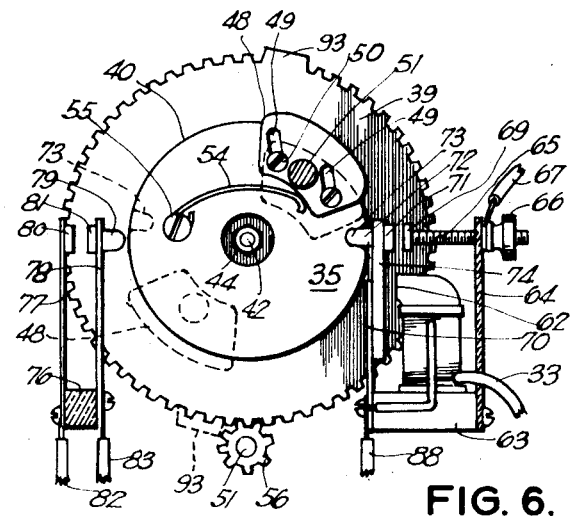
Fig. 6 is a front elevational view, partly in section, of a portion of the shutter and motor timing control, and, Fig. 7 is a schematic view of the electrical wiring for the device.

When machine B nears the completion of its run of film, its switch 10b will be operated, in the manner previously described as the operation of switch 10a. Motor 68 will automatically be started, shutter 86 will thereafter be closed and simultaneously with its closing, shutter 85 of machine A will be opened. Motor 84 will continue to operate until the said cam 48 will have been manually returned to its original position, as shown in Figure 6, by means of the said handle 51. In this position the arm 70 will spring back, with lug 72 in recess 73, contact between points 69 and 71 will be broken, and motor 84 will stop.

In the manner described each machine at the close of its film run will automatically set in operation its associate machine.

In manually resetting said member 35, the outer edge of cam 48 will be drawn into alinement with the periphery of said member 40, by handle 51 so that in the clockwise movement of said member 40 the said cam 48 will not contact the lug 79, and cause a contact of the points 80 and 81.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as described as fairly fall within the scope of my invention.

Having thus described my invention what is claimed and desired to be secured by Letters Patent, is:

1. In an automatic changeover control for companion motion picture projecting machines the combination with a peripherally toothed, spring actuated wheel, means contacting the teeth of said wheel for governing the speed of its rotation, means for releasing said wheel to the rotational action of its spring simultaneously with the closing of a motor starting switch of one machine, said wheel having a peripheral outstanding lug for contacting said governing means and stopping its rotation, a circular outstanding central portion upon the face of said wheel, a plate flatly and slidably mounted adjacent the periphery of said outstanding portion, a shutter control switch adjacent said wheel, said plate spring actuated to normally extend beyond said periphery and to contact and close said shutter control switch upon the partial rotation of said wheel for simultaneously opening the shutter of one machine and closing the shutter of the other machine, said plate having an outstanding handle for manually resetting said wheel, said plate arranged to recede within the periphery of said outstanding portion as said wheel is being reset, of means for automatically actuating said motor starting switch and releasing said wheel when a predetermined amount of film has been run off of the reel of the other machine.

2. Organization as claimed in claim 1 in which the means for automatically actuating the said motor starting switch comprises an L-shaped member having two perpendicular sides, said member pivoted at the point of junction of said sides upon the reel drum, one of said sides adapted to be retained between desired windings of a film roll, and to be spring actuated to cause the other of said sides to trip said motor starting switch when the film is unwound.

3. In automatic changeover control for companion motion picture projecting machines, the combination with means for starting the driving motor of one machine when a predetermined amount of film has been run off the other machine, of a shutter control mechanism comprising a peripherially toothed, rotatably mounted, spring actuated wheel having a speed governing means engaging its teeth, electrically operated means for releasing said wheel to the rotational action of its spring simultaneously with the starting of said motor, a shutter control switch mounted adjacent said wheel for simultaneously opening the shutter of one machine and closing the shutter of the other, means carried by said wheel for closing said shutter control switch after the wheel has rotated to a desired point, the last above means adapted to hold said shutter control switch closed for a given period of time and to then open it, means for stopping the rotation of said wheel at a desired point, and means for resetting said wheel without again closing said shutter control switch.

4. Organization as described in claim 3, in which said wheel stopping means comprises a lug for contacting the governing means when the wheel has reached a desired point of rotation.

5. Organization as described in claim 3, in which said shutter control switch closing means comprises a circular outstanding central portion firmly attached to said wheel, a plate flatly mounted on said portion adjacent its periphery, said plate spring actuated to normally extend beyond the periphery of said portion and to contact and close said shutter control switch upon the partial rotation of said wheel.

JOSEPH F. CORY.